United States Patent
Lay et al.

(10) Patent No.: US 10,291,911 B2
(45) Date of Patent: May 14, 2019

(54) CLASSES OF TABLES FOR USE IN IMAGE COMPRESSION

(71) Applicant: Motorola Mobility LLC, Chicago, IL (US)

(72) Inventors: Thomas Lay, Highland Park, IL (US); Doina Petrescu, Vernon Hills, IL (US); Bill Ryan, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 331 days.

(21) Appl. No.: 15/364,063

(22) Filed: Nov. 29, 2016

(65) Prior Publication Data

US 2018/0152709 A1 May 31, 2018

(51) Int. Cl.
*H04N 19/13* (2014.01)
*H04N 19/124* (2014.01)
*H04N 19/172* (2014.01)

(52) U.S. Cl.
CPC ........... *H04N 19/124* (2014.11); *H04N 19/13* (2014.11); *H04N 19/172* (2014.11)

(58) Field of Classification Search
None
See application file for complete search history.

(56) References Cited

U.S. PATENT DOCUMENTS

| | | | | |
|---|---|---|---|---|
| 6,041,144 A | * | 3/2000 | Sugiura | G06T 9/00 375/240.03 |
| 9,031,329 B1 | * | 5/2015 | Farid | G06K 9/00577 382/209 |
| 2005/0169540 A1 | * | 8/2005 | Funakubo | G06T 9/005 382/232 |
| 2011/0096985 A1 | * | 4/2011 | Matsuhira | H04N 19/176 382/166 |

* cited by examiner

*Primary Examiner* — Bernard Krasnic
(74) *Attorney, Agent, or Firm* — SBMC

(57) ABSTRACT

Techniques for classes of tables for use in image compression are described. Classes of tables for use in image compression may provide increased compression without a reduction in quality compared to conventional image compression techniques. In at least some implementations, a plurality of table classes are generated that correspond to a particular camera subsystem, each table class containing a Huffman table and a quantization table. When an image captured by the particular camera subsystem is encoded, a table class is selected based on camera subsystem parameters associated with the image, and the Huffman table and the quantization table of the selected table class are utilized to encode the image.

20 Claims, 8 Drawing Sheets

CLASSES OF TABLES FOR USE IN IMAGE COMPRESSION

BACKGROUND

Non-encoded image data consumes large amounts of storage space, and it is exceedingly uncommon for an image to be stored without first encoding the image data. Typically, image data is encoded and compressed to reduce the file size, and is stored in a format such as JPEG, BMP, GIF, and so forth. Despite using an encoded file format, high resolution digital cameras may create images with large file sizes, such as 5 megabytes or more, in order to maintain an acceptable quality of the image. Digital cameras within mobile devices such as mobile phones are commonly utilized for capturing images. However, mobile devices may lack the processing and battery capacity to efficiently encode images, and may lack the storage capacity to store many images without efficient encoding. Thus, storing images captured by cameras of mobile devices presents a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for classes of tables for use in image compression are described. Classes of tables for use in image compression may provide increased compression without a reduction in quality compared to conventional image compression techniques. In at least some implementations, a plurality of table classes are generated that correspond to a particular camera subsystem, each table class containing a Huffman table and a quantization table. When an image captured by the particular camera subsystem is encoded, a table class is selected based on camera subsystem parameters associated with the image, and the Huffman table and the quantization table of the selected table class are utilized to encode the image.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
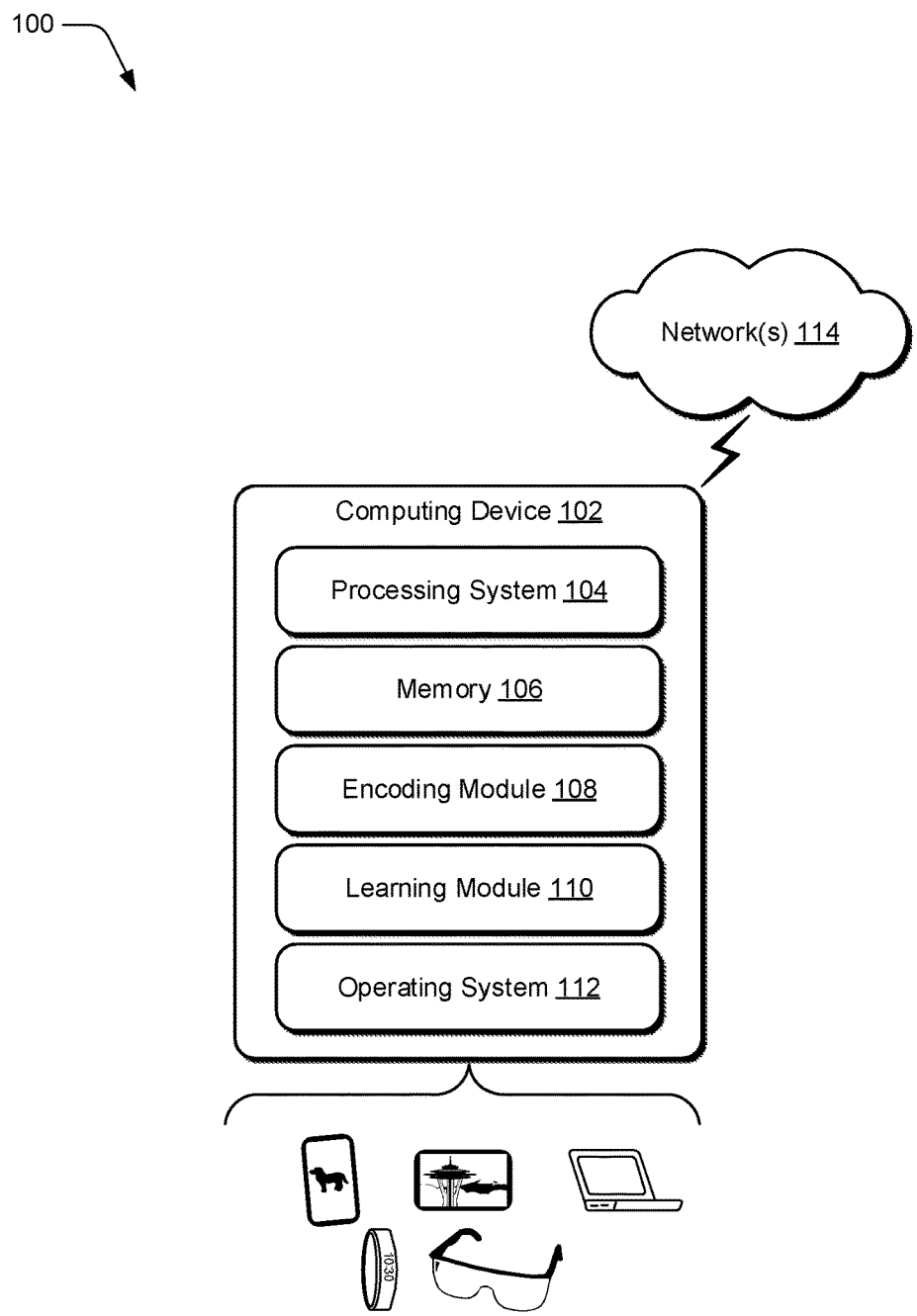
FIG. 1 is an illustration of an environment in an example implementation that is operable to employ techniques discussed herein in accordance with one or more implementations.

Various techniques exist to encode image data into a compressed format with a smaller file size compared to a non-compressed format. However, optimized techniques require excessive processing resources and the process may consume more time than a consumer is willing to spend. In particular, when an image is captured and encoded by a mobile device, optimized encoding techniques may require an excessive power draw against a battery of the mobile device. However, a mobile device may have a relatively small amount of memory in which to store digital images.

Accordingly, techniques for classes of tables for use in image compression are described. For example, an image compression technique using categorized tables may increase the compression and reduce the file size of images without a significant increase in consumed resources compared to standard encoding techniques. According to various implementations, a plurality of table classes are generated that correspond to a particular camera subsystem, each table class containing a Huffman table and a quantization table. When an image captured by the particular camera subsystem is encoded, a table class is selected based on camera subsystem parameters associated with the image, and the Huffman table and the quantization table of the selected table class are utilized to encode the image.

In at least some implementations, a plurality of images that each include data indicating camera subsystem parameters for a camera subsystem used to capture the respective image are received. For each image, an optimal Huffman table and an optimal quantization table are generated. Based on the optimal Huffman tables, the optimal quantization tables, and the camera subsystem parameters, a plurality of table classes are generated such that each table class has a quantization table and a Huffman table that are representative of one or more images of the plurality of images. The plurality of table classes are stored in a manner that allows any image to be categorized as belonging to a table class, based on camera subsystem parameters associated with the image. In some implementations, the plurality of images are each associated with a camera subsystem of a particular mobile phone model, and the plurality of table classes are stored on the particular mobile phone model.

Further, in at least some implementations, an image is received that includes data indicating camera subsystem parameters for a camera subsystem used to capture the image. The camera subsystem parameters are used to select a table class that includes a quantization table and a Huffman table. The image is then encoded utilizing the quantization table and the Huffman table of the table class. In this manner, any image may be encoded more efficiently than by utilizing a standard quantization table and a standard Huffman table without the need to generate an optimal table. An image encoded in this manner may be compressed less efficiently than by using an optimal quantization table and an optimal Huffman table, however the current and processor drain on the encoding device is significantly lower. In some implementations, the image is captured by a particular mobile phone model, and the plurality of table classes are tuned to the particular mobile phone model, and the plurality of table classes are predetermined and stored on the particular mobile phone model.

In at least some implementations, the table classes are generated on a server device and then propagated to mobile devices to be used in an encoding process. Thus, implementations provide ways of increasing the compression ratio of encoded images without requiring a significant increase in processor usage or battery consumption by a device performing the encoding process. Such implementations may allow for a mobile device to more efficiently encode images without the limitations and drawbacks of optimized encoding methods.

In one or more implementations, the term "Huffman table", as used herein, may refer to multiple related Huffman tables intended to be used in the encoding process of an image. For example, the term "Huffman table" may collectively refer to a luminance Huffman table and a chrominance Huffman table, may collectively refer to a luminance Huffman table, a chrominance-blue Huffman table, and a chrominance-red Huffman table, and so forth.

In one or more implementations, the term "quantization table", as used herein, may refer to multiple related quantization tables intended to be used in the encoding process of an image. For example, the term "quantization table" may collectively refer to a luminance quantization table and a chrominance quantization table, may collectively refer to a luminance quantization table, a chrominance-blue quantization table, and a chrominance-red quantization table, and so forth.

The terms "optimal Huffman table" and "optimal quantization table", as used herein, may refer to a Huffman table or a quantization table, respectively, that is generated for use with a particular image, include only values used for encoding the particular image, and is optimized for the actual frequency distributions in the image. Additionally, a table may be "optimal" only for the image it is generated for use with. Thus, a table may be optimal for one image and non-optimal for a different image.

The terms "standard Huffman table" and "standard quantization table", as used herein, may refer to a Huffman table or a quantization table, respectively, that is generated and distributed for widespread and general use, include all values that may be potentially used for encoding any image, and are optimized for average or theoretical expected frequency distributions among all images. An example of standard Huffman and quantization tables are the tables provided by the JPEG Standard (ISO/IEC 10918, ITU-T.81), Annex K; in particular, Table K.1 provides a Luminance quantization table, Table K.2 provides a Chrominance quantization table, Table K.3 provides a luminance DC Huffman table, Table K.4 provides a chrominance DC Huffman table, Table K.5 provides a luminance AC Huffman table, and Table K.6 provides a chrominance AC Huffman table.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example procedures for classes of tables for use in image compression in accordance with one or more implementations. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for classes of tables for use in image compression described herein. The environment 100 includes a computing device 102 which may be configured in a variety of ways.

The computing device 102, for instance, may be configured as any type of client or user device that includes fixed or mobile, wired and/or wireless devices. For example, the computing device 102 may be a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). One of a variety of different examples of the computing device 102 is shown and described below in FIG. 8.

Figure 2:
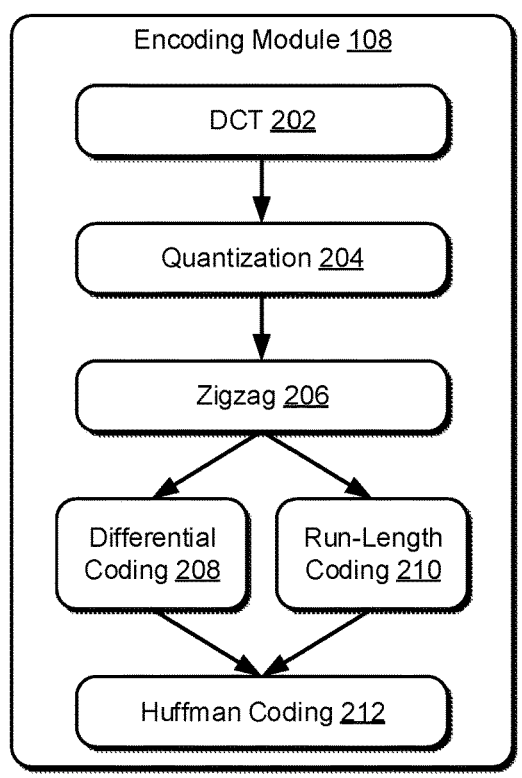
FIG. 2 is an illustration of an environment in an example implementation that is operable to employ techniques for classes of tables for use in image compression discussed herein in accordance with one or more implementations.
Figure 3:
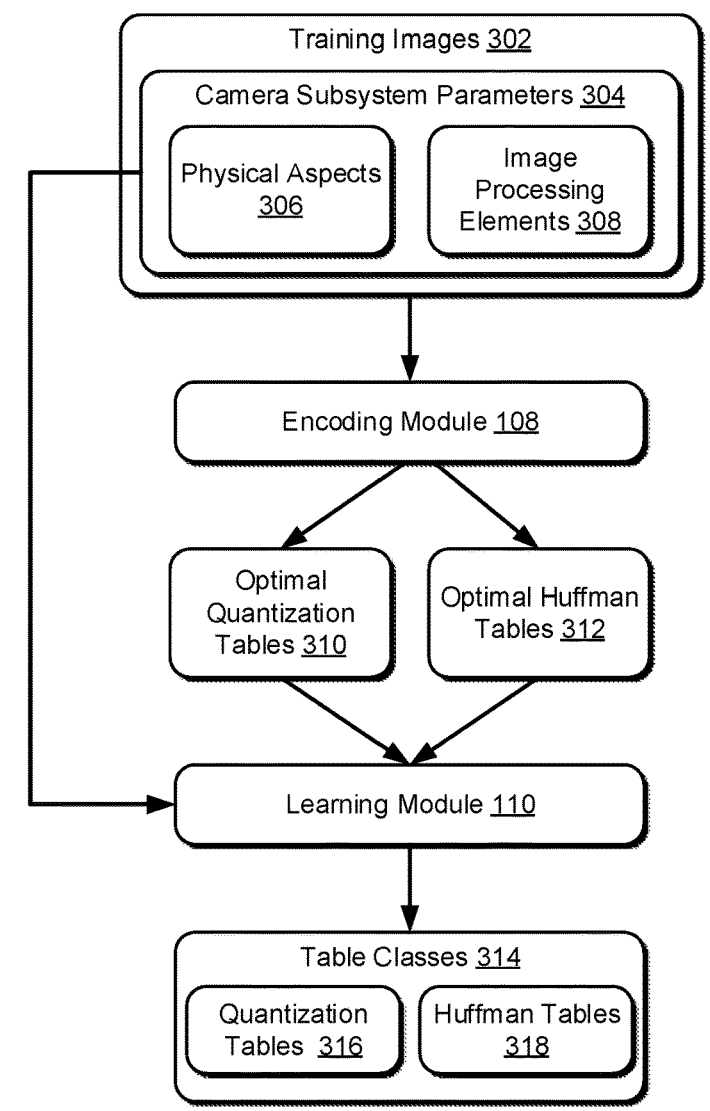
FIG. 3 illustrates an example implementation scenario for generating table classes in accordance with one or more implementations.

The computing device 102 is illustrated as including a variety of hardware components, examples of which include a processing system 104 and an example of a computer-readable storage medium illustrated as a memory 106. The processing system 104 is representative of functionality to perform operations through execution of instructions stored in the memory 106. Although illustrated separately, functionality of these components may be further divided, combined (e.g., on an application specific integrated circuit), and so forth. The computing device 102 of FIG. 1 further includes an encoding module 108 and a learning module 110 that may implement one or more of the techniques for classes of tables for use in image compression as illustrated in FIGS. 2 and 3. The encoding module 108 represents logic that may generate quantization tables and Huffman tables for images. The encoding module 108 further represents logic that may encode images, such as by selecting a table class for an input image and encoding the image utilizing quantization and Huffman tables associated with the selected table class. The learning module 110 represents logic that may utilize machine learning techniques to generate table classes including quantization tables and Huffman tables.

The computing device 102 is further illustrated as including an operating system 112. The operating system 112 is configured to abstract underlying functionality of the computing device 102 to the encoding module 108 and the learning module 110. For example, the operating system 112 may abstract the processing system 104, the memory 106, and/or a network 114 functionality of the computing device 102 such that the encoding module 108 and the learning module 110 may be written and/or operate without knowing "how" this underlying functionality is implemented. The encoding module 108 or the learning module 110, for instance, may provide data to the operating system 112 to be rendered and displayed without understanding how this rendering will be performed. The operating system 112 may also represent a variety of other functionality, such as to manage a file system and user interface that is navigable by a user of the computing device 102.

The network 114 is representative of one or more wired and/or wireless networks that provide the computing device 102 with connectivity to various other networks, services, and/or entities. The network 114 may provide the computing device 102 with connectivity via a variety of different connectivity technologies, such as broadband cable, digital subscriber line (DSL), wireless data connectivity (e.g., WiFi™), T-carrier (e.g., T1), Ethernet, cellular data connectivity, and so forth.

FIG. 2 is an illustration of an environment 200 in an example implementation that is operable to employ techniques for classes of tables for use in image compression described herein. According to various implementations, the environment 200 represents an extension of the environment 100. For instance, the encoding module 108 introduced above may implement one or more of the techniques for classes of tables for use in image compression as illustrated in FIGS. 3-7.

The encoding module 108 may perform an encoding process upon an image. The encoding process includes use of a Discrete Cosine Transformation (DCT) component 202, a quantization component 204, a zigzag component 206, a differential coding component 208, a run-length coding component 210, and a Huffman coding component 212. The DCT component 202 uses a discrete cosine transformation to transform the image from a spatial domain representation (such as an image represented by YCbCr triplets) into a frequency domain representation. The DCT component 202 performs the discrete cosine transformation on 8 by 8 pixel blocks of the image, resulting in a DCT matrix for each 8 by 8 block. The quantization component 204 performs operations including dividing the values of each DCT matrix by values of a quantization table, and the resulting values are rounded to the nearest integer. The resultant matrices produced by the quantization component 204 are reordered by the zigzag component 206. The zigzag component 206 maps the 8 by 8 resultant matrices to 1 by 64 vectors, and in general sorts the matrix from low-frequency components to high-frequency components. The differential coding component 208 encodes the difference in the average value across an entire block (DC component) compared to a previous block, creating DC coefficients. The run-length coding component 210 stores a value of each 1 by 64 vector (AC component) along with the number of zeroes preceding the value, such that non-zero values are saved and the number of zeroes between each non-zero value is counted. Thus, the run-length coding component 210 stores a 'skip' number with each value, where the 'skip' number is a number of zeroes that occur before the value, with the assumption that all values are non-zero (AC coefficient). The Huffman coding component 212 utilizes a Huffman table to map the AC and DC coefficients to code values of variable-length. The Huffman coding component 212 allows for variable-length storage of values, in which common or frequently occurring values are represented by the smallest number of bits, and uncommon or infrequently occurring values are represented by a larger number of bits. The Huffman table describes the relationship between starting values and their variable-length codes, and vice versa. The Huffman coding component 212 may use an existing Huffman table, such as a standard Huffman table, or may generate and use an optimal Huffman table for the image. An optimal Huffman table is specific to a particular image, and contains values corresponding only to values that are present in the particular image. Standard Huffman tables exist in which the average frequency of values in unknown images are estimated, providing sub-optimal encoding without generating a Huffman table for every image.

Having described an example environment in which the techniques described herein may operate, consider now a discussion of some example implementation scenarios in accordance with one or more implementations.

Example Implementation Scenarios

The following discussion describes example implementation scenarios for classes of tables for use in image compression in accordance with one or more implementations. In portions of the following discussion, reference will be made to the environments 100 of FIG. 1 and/or 200 of FIG. 2.

FIG. 3 illustrates an example implementation scenario 300 for generating table classes in accordance with one or more implementations.

The scenario 300 of FIG. 3 includes training images 302. The training images 302 may be received from a large database of images. For example, the training images 302 may be received from a large online database of images generated specifically by the imaging system of a particular mobile phone. Each respective training image 302 includes data indicating camera subsystem parameters 304 that characterize how the image was captured. The camera subsystem parameters 304 may include information pertaining to physical aspects 306 and image processing elements 308. The physical aspects 306 describe the physical aspects of the camera subsystem used to capture the image. The physical aspects 306 may include, for example, information describing optics, lens sharpness, lens distortion, and components of a camera module, such as a lens stack, an image sensor, a lens actuator, and so forth. The image processing elements 308 describe image processing elements produced by an image processing pipeline used in capturing the image. The image processing elements 308 may include, for example, information describing "3A" values (e.g. exposure, white-balance, focus), a scene type (e.g. static, panning, object tracking, low light, HDR, and the like), a lens position (e.g. macro, non-macro), a depth map, a dynamic sharpness, a dynamic denoising, a global tone mapping, a local tone mapping, and so forth. The camera subsystem parameters 304 may include any information that helps characterize how an image was captured by a camera subsystem.

In some implementations, the training images 302 may include only images including data that indicates the same physical aspects 306. For example, a particular mobile phone model may include a camera having particular physical aspects, and the training images 302 may include only images including data that indicates the particular physical aspects of the particular mobile phone model. Alternatively, in some implementations, the training images 302 may include images including data that indicates similar physical aspects 306. For example, a particular mobile phone model may allow for multiple cameras (e.g. a front facing camera and a rear facing camera), each camera having different physical aspects. In such an implementation, the training images 302 may include images including data that indicates any of the physical aspects that may be associated with the particular mobile phone model.

The encoding module 108 receives as input the training images 302. The encoding module generates an optimal quantization table 310 and an optimal Huffman table 312 for each of the training images 302. The optimal quantization tables 310 and the optimal Huffman tables 312 may be generated such as with the technique described above with respect to the Huffman coding component 212 of FIG. 2.

That is, the technique described above with respect to the Huffman coding component 212 may be performed individually for each respective one of the training images 302.

The learning module 110 receives as input the optimal quantization tables 310 and the optimal Huffman tables 312, as well as the camera subsystem parameters 304. The learning module 110 may utilize a learning algorithm (e.g. machine learning or a neural network) that uses the camera subsystem parameters to classify the optimal quantization tables 310 and the optimal Huffman tables 312 into a number of groupings to generate a specified number of table classes 314. For each respective table class 314, a quantization table 316 and a Huffman table 318 is selected or generated. In some implementations, the quantization table 316 and the Huffman table 318 for a particular table class 314 may correspond to one of the optimal quantization tables 310 and one of the optimal Huffman tables 312 that are considered representative of all of the optimal quantization tables 310 and all of the optimal Huffman tables 312 within the grouping associated with the particular table class 314. Alternatively, the quantization table 316 and the Huffman table 318 for the particular table class 314 may be generated based on some or all of the optimal quantization tables 310 and the optimal Huffman tables 312 within the grouping associated with the particular table class 314. For example, the quantization table 316 and the Huffman table 318 may be generated such that they are considered an 'average' of the optimal quantization tables 310 and the optimal Huffman tables 312 within the grouping associated with the particular table class 314.

Figure 4:
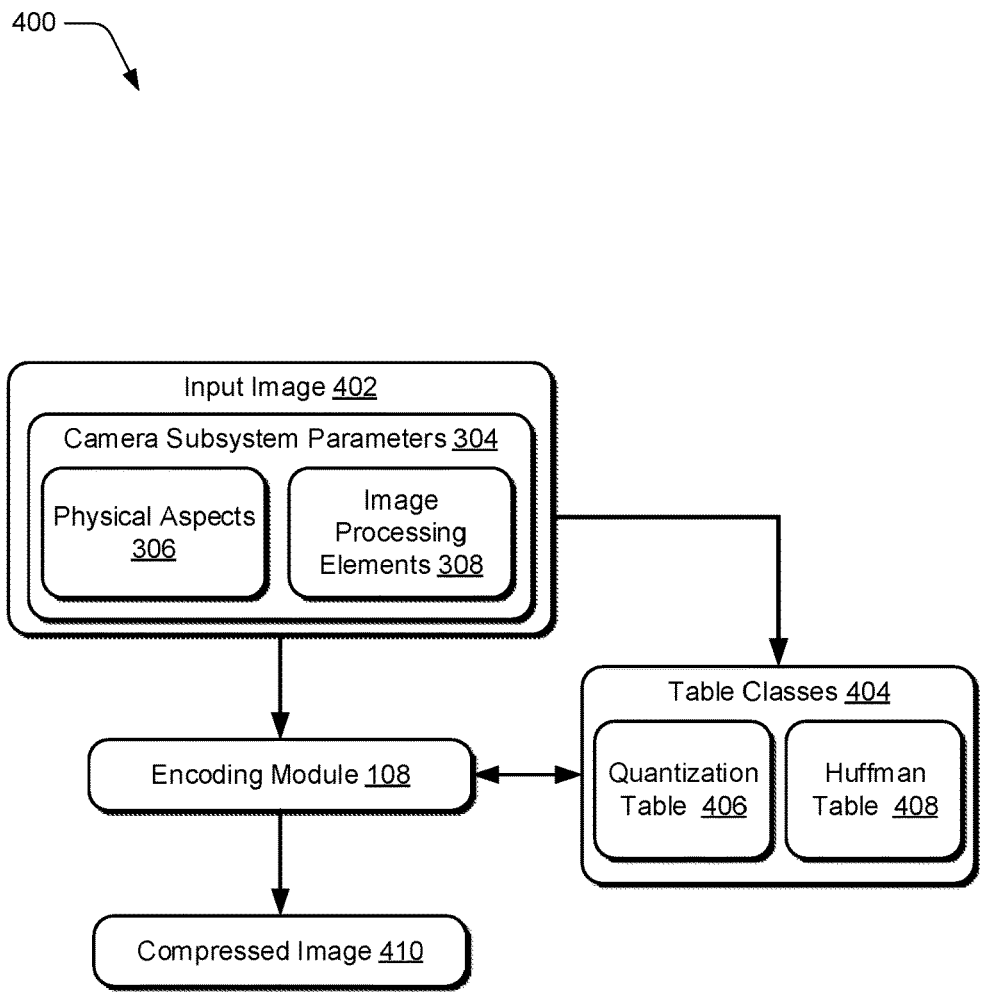
FIG. 4 illustrates an example implementation scenario for utilizing table classes in encoding an input image in accordance with one or more implementations.

FIG. 4 illustrates an example implementation scenario 400 for utilizing table classes in encoding an input image in accordance with one or more implementations.

The scenario 400 of FIG. 4 includes one or more images that are captured and provided as an input image 402 to the encoding module 108. For example, the computing device 102 captures or receives through the network 114 the input image 402 and the camera subsystem parameters 304 including the physical aspects 306 and the image processing elements 308.

In some implementations, the computing device 102 may include a particular camera subsystem and store the physical aspects 306 of the particular camera subsystem in the memory 106. In such implementations, the physical aspects 306 may be omitted from data associated with the input image 402, as any of the input images 402 captured by the computing device 102 will share the same physical aspects 306.

The scenario 400 further includes a number of table classes 404. The tables classes 404 may be similar to the table classes 314 described above with respect to FIG. 3. In implementations where the computing device 102 includes a particular camera subsystem with particular physical aspects 306, the table classes 404 may include only table classes corresponding to the particular physical aspects 306 of the particular camera subsystem of the computing device 102.

The encoding module 108 is configured to select the table class 404 based on the camera subsystem parameters 304 of the input image 402. The selection may include comparing the camera subsystem parameters 304 of the input image 402 with camera subsystem parameters associated with each respective table class 404. Once a table class has been selected, the encoding module 108 performs an encoding process upon the input image 402, such as by utilizing the DCT component 202, the quantization component 204, the zigzag component 206, the differential coding component 208, the run-length coding component 210, and the Huffman coding component 212 as described above with respect to FIG. 2. However, the operations performed by the quantization component 204 utilize a quantization table 406 associated with the selected table class 404. Further, the operations performed by the Huffman coding component 212 utilize a Huffman table 408 associated with the selected table class 404. Upon completion of the encoding process, the encoding module 108 generates a compressed image 410. In implementations, the quantization table 406 and the Huffman table 408 are stored in a header of the compressed image 410 or in other metadata associated with the compressed image 410.

Example Procedures

The following section describes some example procedures for Classes of tables for use in image compression in accordance with one or more implementations. The procedures, for instance, describe example ways of implementing various aspects of the example implementation scenarios described above. This is not to be construed as limiting, however, and the procedures may be employed in a variety of other implementation scenarios within the spirit and scope of the claimed implementations.

The procedures described herein may be used separately or in combination with each other, in whole or in part. These procedures are shown as sets of operations (or acts) performed, such as through one or more entities or modules, and are not necessarily limited to the order shown for performing the operation. The example procedures may be employed in the environment 100 of FIG. 1, the environment 200 of FIG. 2, the system 800 of FIG. 8, and/or any other suitable environment. According to one or more implementations, the procedures describe example ways for performing various aspects of the example implementation scenarios described herein. In at least some implementations, steps described for the various procedures are implemented automatically and independent of user interaction.

Figure 5:
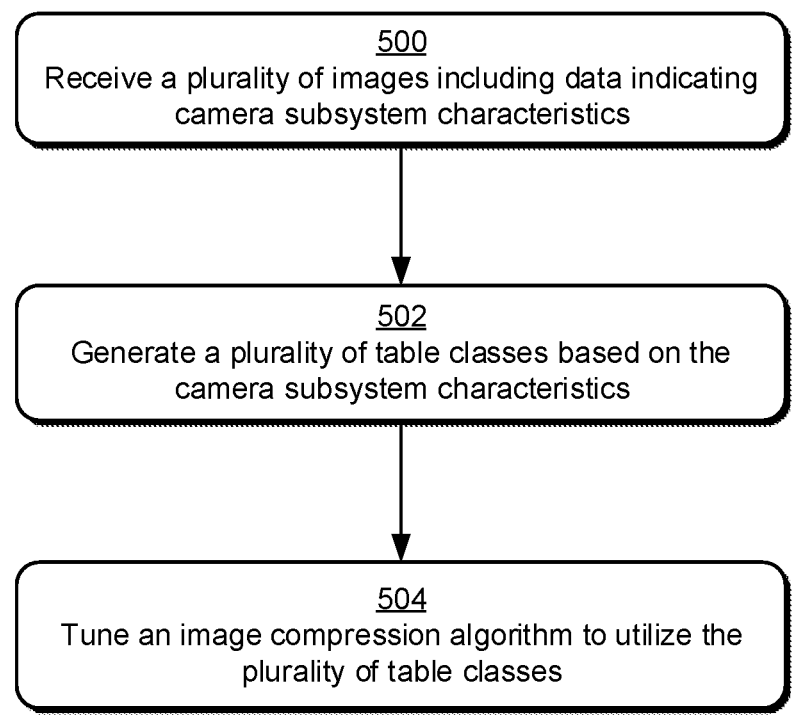
FIG. 5 is a flow diagram that describes steps in a method for tuning an image compression algorithm in accordance with one or more implementations.

FIG. 5 is a flow diagram that describes steps in a method for tuning an image compression algorithm in accordance with one or more implementations.

Step 500 receives a plurality of images including data indicating camera subsystem characteristics. The plurality of images may be, for instance, the training images 302 described above with respect to FIG. 3. In some implementations, the plurality of images includes only images indicating camera subsystem characteristics with the physical aspects of a particular camera subsystem. The camera subsystem characteristics may include physical aspects of a camera subsystem as well as image processing elements produced by the image processing pipeline, such as those described above with reference to the camera subsystem parameters 304 of FIG. 3.

Step 502 generates a plurality of table classes based on the camera subsystem characteristics. This generating utilizes a machine learning system to analyze the plurality of images including data indicating camera subsystem characteristics to recognize a specified number of table classes such that near optimal compression can be achieved based on the table classes without a loss in perceptual quality. The machine learning system refers to technology in a digital environment that is capable of producing an output based on an input using knowledge or intelligence garnered from training. Training samples are input to a machine learning system during training so that the machine can learn about at least one relationship incorporated into the training samples, in this case characteristics that may impact compression of the images. In this example, the training samples are a dataset of images along with data representing camera subsystem characteristics, and the output is a plurality of table classes that may be used to tune an image compression algorithm.

Step 504 tunes an image compression algorithm to utilize the plurality of table classes. Tuning the image compression algorithm includes modifying the image compression algorithm to select one of the plurality of table classes when performing the image compression algorithm on an image. The selection may include comparing the camera subsystem characteristics associated with an input image to camera subsystem characteristics associated with each respective table class. Tuning the image compression algorithm further includes modifying the image compression algorithm to perform different actions based on the selected table class. For example, a JPEG image compression algorithm may be modified to utilize a custom Huffman table and a custom quantization table associated with the selected table class. In this manner, the image compression algorithm is tuned to achieve near optimal compression without a loss in perceptual quality for images captured by a camera with a camera subsystem similar to that described by the camera subsystem characteristics of the plurality of images.

Figure 6:
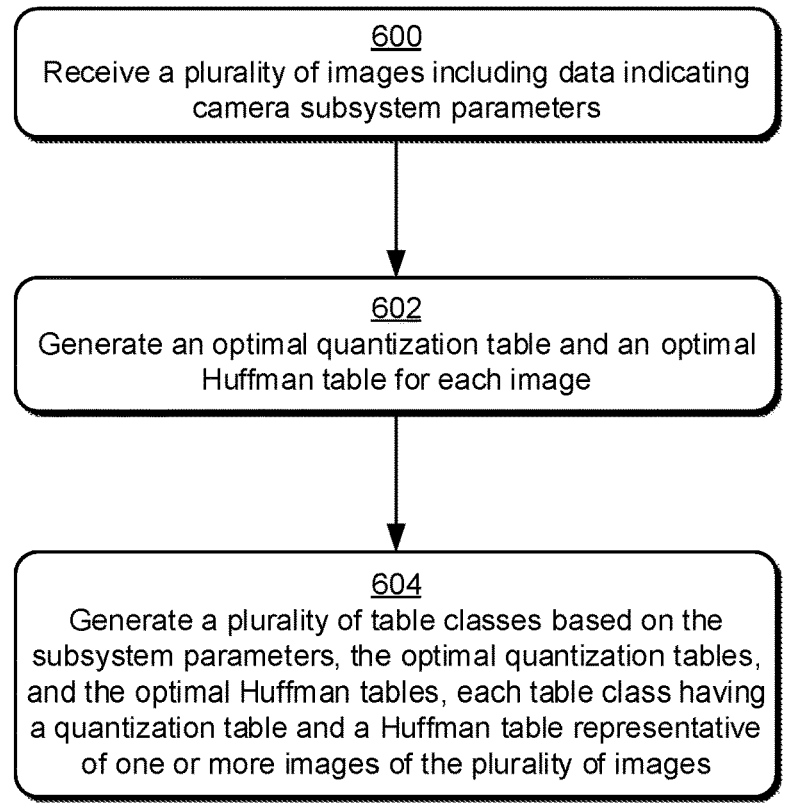
FIG. 6 is a flow diagram that describes steps in a method for generating table classes in accordance with one or more implementations.

FIG. 6 is a flow diagram that describes steps in a method for generating table classes in accordance with one or more implementations.

Step 600 receives a plurality of images including data indicating camera subsystem parameters. The plurality of images may be, for instance, the training images 302 described above with respect to FIG. 3. In some implementations, the plurality of images includes only images indicating camera subsystem parameters with the physical aspects of a particular camera subsystem. For example, the plurality of images may include only images taken by a particular mobile phone model.

Step 602 generates an optimal quantization table and an optimal Huffman table for each image of the plurality of images. If the plurality of images contains a number N images, then N optimal quantization tables and N optimal Huffman tables are generated. The optimal quantization and Huffman tables may be generated by any suitable means, such as those described above with reference to the Huffman coding component 212 of FIG. 2.

Step 604 generates a plurality of table classes based on the camera subsystem parameters, the optimal quantization tables, and the optimal Huffman tables, each table class having a quantization table and a Huffman table representative of one or more images of the plurality of images. This may be performed by the learning module 110 of FIGS. 1 and 3. For example, a table class may be generated based on optimal quantization tables and optimal Huffman tables that are associated with the same or similar camera subsystem parameters. The plurality of table classes may comprise a particular number of table classes, and the number may be variable based on a user input or may be variable based on a learning algorithm. The number of table classes may, for instance, impact the performance of an encoding process that utilizes the table classes. A larger number of table classes will result in a higher increase in compression ratio and a smaller file size for images compressed utilizing the table classes, at the expense of increased processing and persistent storage requirements on a device performing the encoding process. A user may select a particular number of desired table classes, for example, to balance these competing concerns.

Each respective generated table class includes a quantization table and a Huffman table that are representative of the optimal quantization tables and the optimal Huffman tables for all images whose subsystem parameters are associated with the respective table class. In some implementations, the quantization table and the Huffman table may not correspond to any of the optimal quantization tables or the optimal Huffman tables. The plurality of table classes are stored in a manner that allows categorization of any image (including images that are not included in the plurality of images in step 600) as belonging to one of the plurality of table classes based on the camera subsystem parameters associated with the image.

Figure 7:
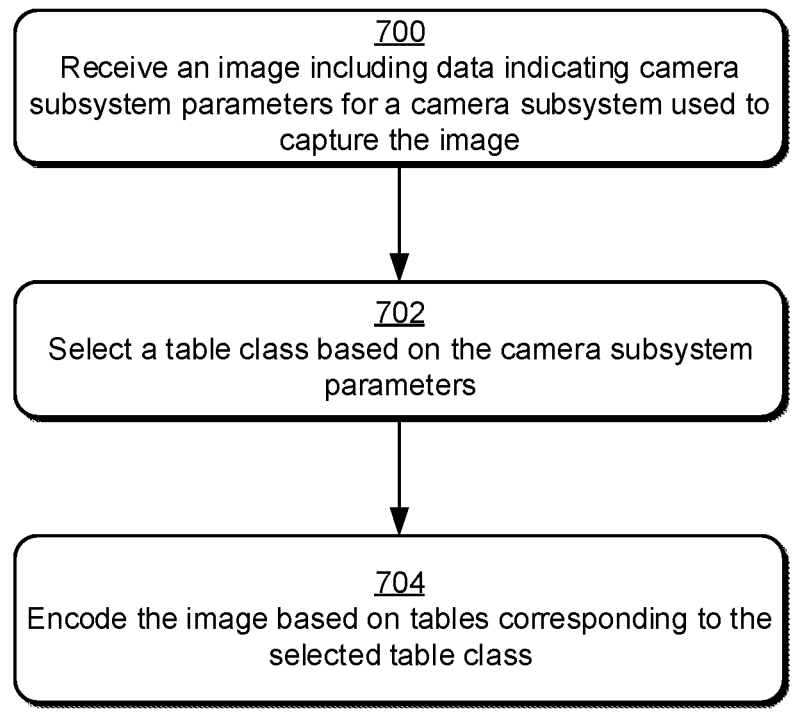
FIG. 7 is a flow diagram that describes steps in a method for encoding an image based on table classes in accordance with one or more implementations.

FIG. 7 is a flow diagram that describes steps in a method for encoding an image based on table classes in accordance with one or more implementations. The method, for instance, describes an example variation and/or extension of the method described above with reference to FIG. 6

Step 700 receives an image including data indicating camera subsystem parameters for a camera subsystem used to capture the image. The image may be, for instance, the input image 402 described with respect to FIG. 4. In implementations, the image is captured by a camera subsystem of a mobile device.

Step 702 selects a table class based on the camera subsystem parameters of the image. The selection may include comparing the camera subsystem parameters of the input image with camera subsystem parameters associated with each respective table class, and may optionally be aided by a learning algorithm. In implementations, the table classes are stored on the mobile device, and the table classes include only table classes associated with the physical aspects of the camera subsystem of the mobile device. The table classes may have been received by the mobile device, for example, from a server that generated the table classes.

Step 704 encodes the image based on tables corresponding to the selected table class. This may be performed by the encoding module 108 of FIGS. 1, 2, and 4. For instance, the encoding module 108 may perform a DCT, a quantization, a zigzag, a differential coding, a run-length coding, and a Huffman coding as described above with reference to FIG. 2. The quantization is performed utilizing a quantization table corresponding to the selected table class, and the Huffman coding is performed utilizing a Huffman table corresponding to the selected table class. The quantization table and the Huffman table that are used to encode the image are stored in a header or other metadata associated with the image.

Having discussed some example procedures, consider now a discussion of an example system and device in accordance with one or more implementations.

Example System and Device

Figure 8:
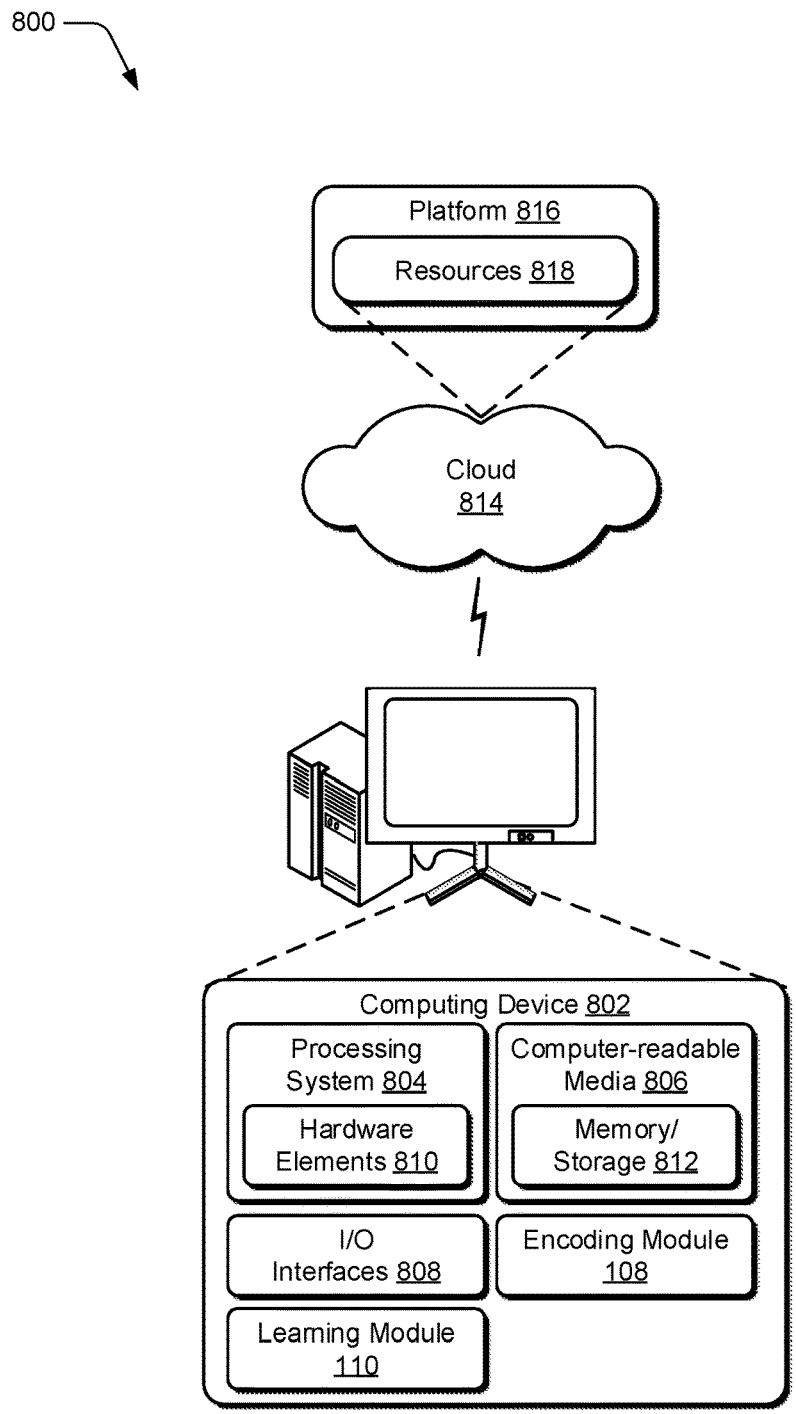
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement the various techniques described herein. This is illustrated through inclusion of the encoding module 108 and the learning module 110. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include embodiment in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other embodiments in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, embodiment of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, embodiment of functionality described herein may be distributed throughout the system 800. For example, the functionality may be implemented in part on the computing device 802 as well as via the platform 816 that abstracts the functionality of the cloud 814.

CONCLUSION

Techniques for classes of tables for use in image compression are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A method comprising:
receiving, by one or more computing devices, an image including data indicating camera subsystem parameters for a camera subsystem used to capture the image, the camera subsystem parameters including information pertaining to one or more physical aspects including a camera module of the camera subsystem, optics of the camera subsystem, a lens sharpness of the camera subsystem, or a lens distortion of the camera subsystem;
selecting, by the one or more computing devices, a table class from a plurality of table classes based on the camera subsystem parameters; and
encoding, by the one or more computing devices, the image based on the selected table class including:
performing a Huffman coding utilizing a Huffman table of the selected table class; and
performing a quantization utilizing a quantization table of the selected table class.

2. The method of claim 1, wherein the camera subsystem parameters include information pertaining to the one or more physical aspects and one or more image processing elements.

3. The method of claim 1, wherein the camera subsystem parameters further include information pertaining to one or more image processing elements including an exposure, a white-balance, a focus, a scene type, a lens position, a depth map, a dynamic sharpness, a dynamic denoising, or a tone mapping.

4. The method of claim 1, wherein each of the plurality of table classes comprises a respective Huffman table and a respective quantization table.

5. The method of claim 1, wherein the Huffman table is a non-optimal Huffman table and the quantization table is a non-optimal quantization table.

6. The method of claim 1, wherein the Huffman table is a non-optimal, non-standard Huffman table and the quantization table is a non-optimal, non-standard quantization table.

7. The method of claim 1, wherein each respective table class includes a Huffman table and a quantization table, wherein each respective Huffman table is different and each respective quantization table is different.

8. A system comprising:
one or more processors; and
one or more computer-readable storage media storing processor-executable instructions that, responsive to execution by the one or more processors, cause the system to perform operations including:
receiving, by one or more computing devices, an image including data indicating camera subsystem parameters for a camera subsystem used to capture the image, the camera subsystem parameters including information pertaining to one or more physical aspects including a camera module of the camera subsystem, optics of the camera subsystem, a lens sharpness of the camera subsystem, or a lens distortion of the camera subsystem;
selecting, by the one or more computing devices, a table class from a plurality of table classes based on the camera subsystem parameters; and
encoding, by the one or more computing devices, the image based on the selected table class including:
performing a Huffman coding utilizing a Huffman table of the selected table class; and
performing a quantization utilizing a quantization table of the selected table class.

9. The system of claim 8, wherein the camera subsystem parameters include information pertaining to the one or more physical aspects and one or more image processing elements.

10. The system of claim 8, wherein the camera subsystem parameters further include information pertaining to one or more image processing elements including an exposure, a white-balance, a focus, a scene type, a lens position, a depth map, a dynamic sharpness, a dynamic denoising, or a tone mapping.

11. The system of claim 8, wherein each of the plurality of table classes comprises a respective Huffman table and a respective quantization table.

12. The system of claim 8, wherein the Huffman table is a non-optimal Huffman table and the quantization table is a non-optimal quantization table.

13. The system of claim 8, wherein the Huffman table is a non-optimal, non-standard Huffman table and the quantization table is a non-optimal, non-standard quantization table.

14. The system of claim 8, wherein each respective table class includes a Huffman table and a quantization table, wherein each respective Huffman table is different and each respective quantization table is different.

15. A method comprising:

storing, by a computing device, a plurality of table classes each including a respective Huffman table and a respective quantization table;

receiving, by the computing device, an image including data indicating camera subsystem parameters for a camera subsystem used to capture the image, the camera subsystem parameters including information pertaining to one or more physical aspects including a camera module of the camera subsystem, optics of the camera subsystem, a lens sharpness of the camera subsystem, or a lens distortion of the camera subsystem;

selecting, by the computing device, a table class from the plurality of table classes based on the camera subsystem parameters; and encoding, by the computing device, the image based on the selected table class including:

performing a Huffman coding utilizing the Huffman table of the selected table class; and performing a quantization utilizing the quantization table of the selected table class.

16. The method of claim 15, wherein the camera subsystem parameters include information pertaining to the one or more physical aspects and one or more image processing elements.

17. The method of claim 15, wherein the camera subsystem parameters further include information pertaining to one or more image processing elements including an exposure, a white-balance, a focus, a scene type, a lens position, a depth map, a dynamic sharpness, a dynamic denoising, or a tone mapping.

18. The method of claim 15, wherein the Huffman table is a non-optimal Huffman table and the quantization table is a non-optimal quantization table.

19. The method of claim 15, wherein the Huffman table is a non-optimal, non-standard Huffman table and the quantization table is a non-optimal, non-standard quantization table.

20. The method of claim 15, wherein each respective table class includes a Huffman table and a quantization table, wherein each respective Huffman table is different and each respective quantization table is different.

* * * * *